Figure 4:
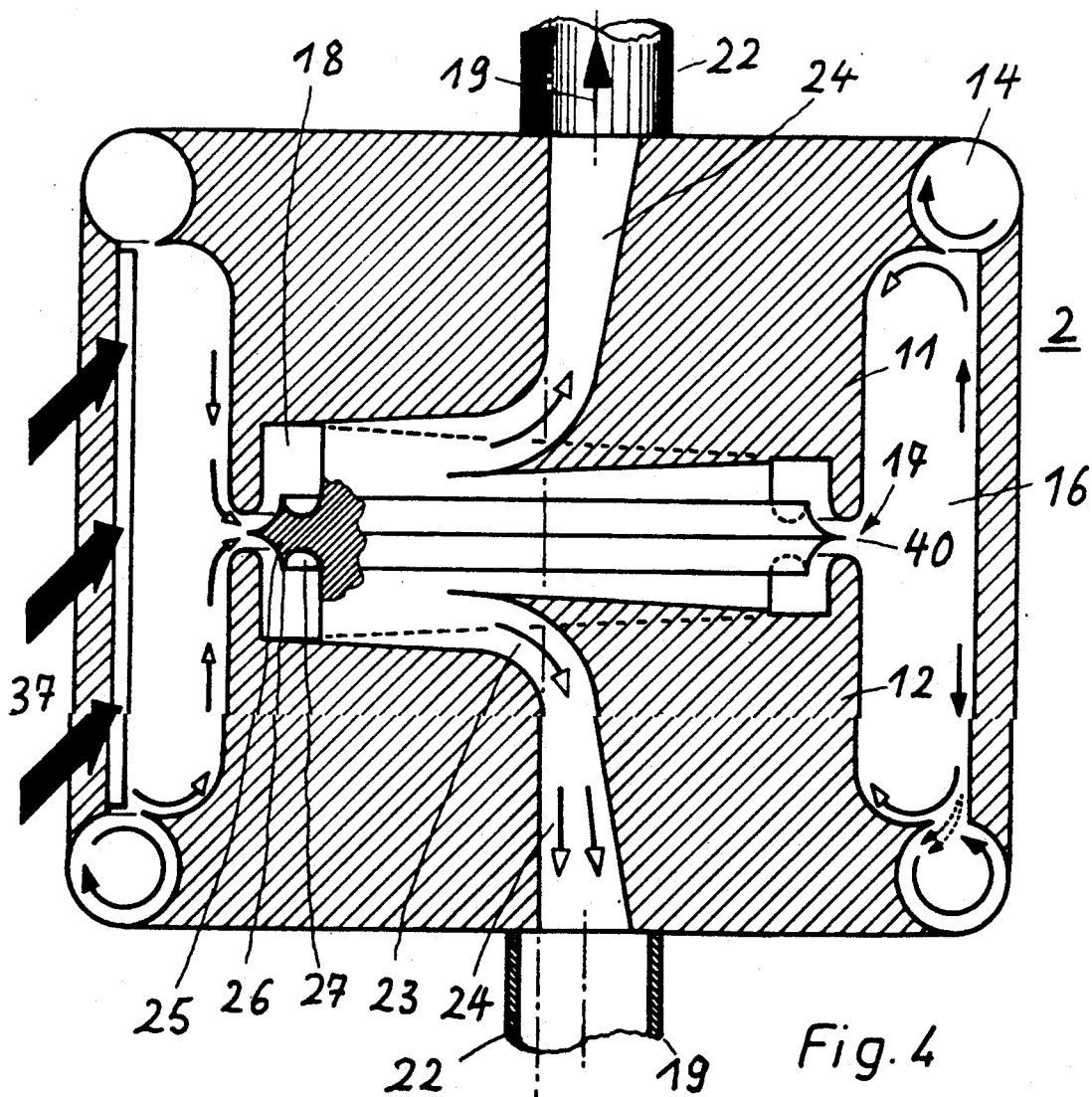

United States Patent
Bielefeldt

[11] Patent Number: 5,163,986
[45] Date of Patent: Nov. 17, 1992

[54] VORTEX CHAMBER SEPARATOR

[76] Inventor: Ernst-August Bielefeldt, Moorweg 44, DE-2352 Bordesholm, Fed. Rep. of Germany

[21] Appl. No.: 793,437

[22] PCT Filed: Mar. 28, 1991

[86] PCT No.: PCT/EP91/00607
§ 371 Date: Dec. 6, 1991
§ 102(e) Date: Dec. 6, 1991

[87] PCT Pub. No.: WO91/15301
PCT Pub. Date: Oct. 17, 1991

[30] Foreign Application Priority Data
Mar. 30, 1990 [DE] Fed. Rep. of Germany ....... 4010238

[51] Int. Cl.[5] .............................................. B01D 45/12
[52] U.S. Cl. ........................................ 55/346; 55/348; 55/459.1; 210/512.2
[58] Field of Search ................................. 55/345–349, 55/459.1; 210/512.2

[56] References Cited
U.S. PATENT DOCUMENTS

| 4,244,708 | 1/1981 | Bielefeldt | 55/345 X |
| 4,276,068 | 1/1981 | Loussermair et al. | 55/348 |
| 4,375,365 | 3/1983 | Muller et al. | 55/346 |
| 4,801,310 | 1/1989 | Bielefeldt | 55/345 X |

Primary Examiner—Charles Hart
Attorney, Agent, or Firm—Sixbey, Friedman, Leedom & Ferguson

[57] ABSTRACT

The invention relates to a vortex chamber separator (1) with at least one vortex chamber and at least one immersion pipe (11, 12). Each immersion pipe is arranged coaxially in the vortex chamber and is connected to a pure gas outlet. In the region of the end walls (9, 10) of the vortex chamber there is an angular channel (13) surrounding at least one immersion pipe (11, 12), forming an annular vortex casing (14). Via a peripheral slot (15), the latter is in communication with the vortex annular space (16) surrounding at least one immersion pipe (11, 12). There is a spiral immersion pipe casing in the region of the immersion pipe opening (17) which is connected to the annular vortex space (16) and at least one fume outlet.

17 Claims, 10 Drawing Sheets

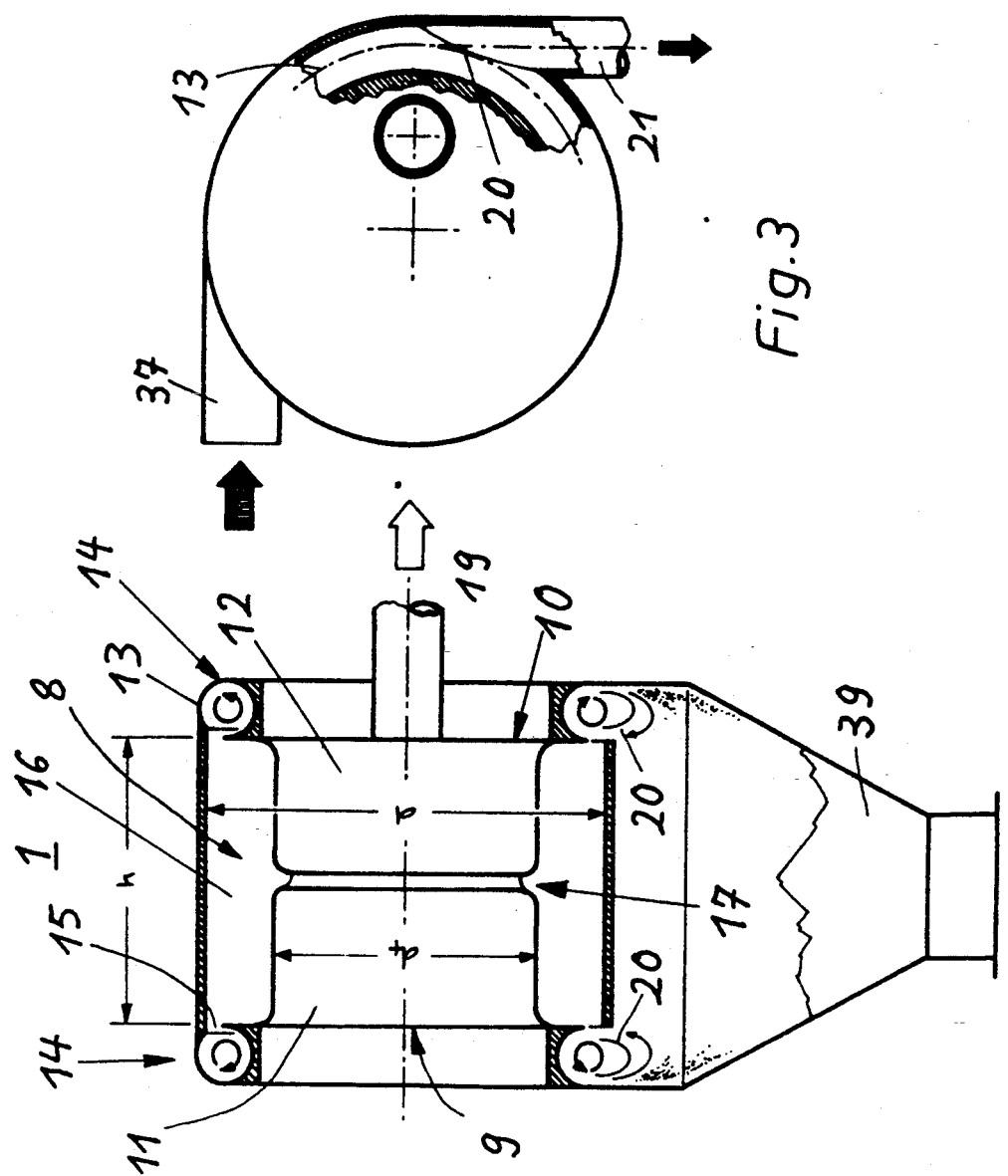
Fig. 3
Fig. 1
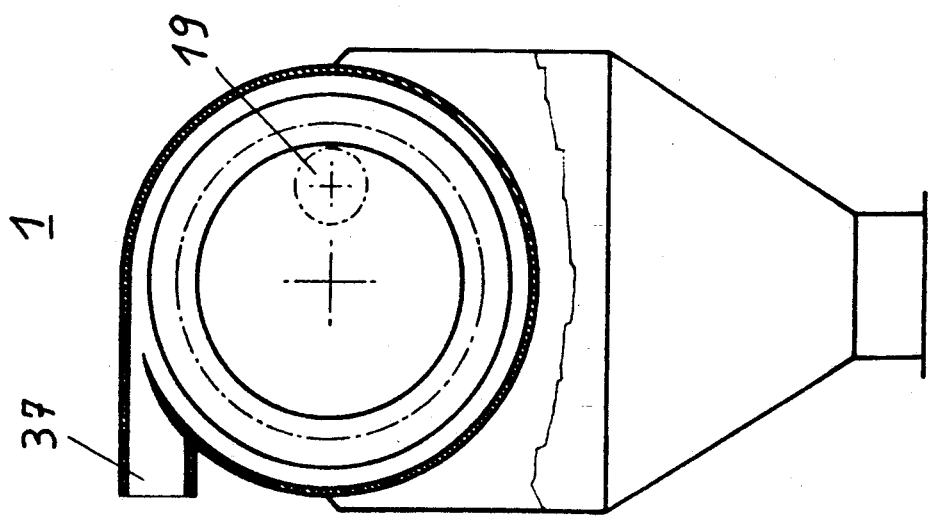
Fig. 2

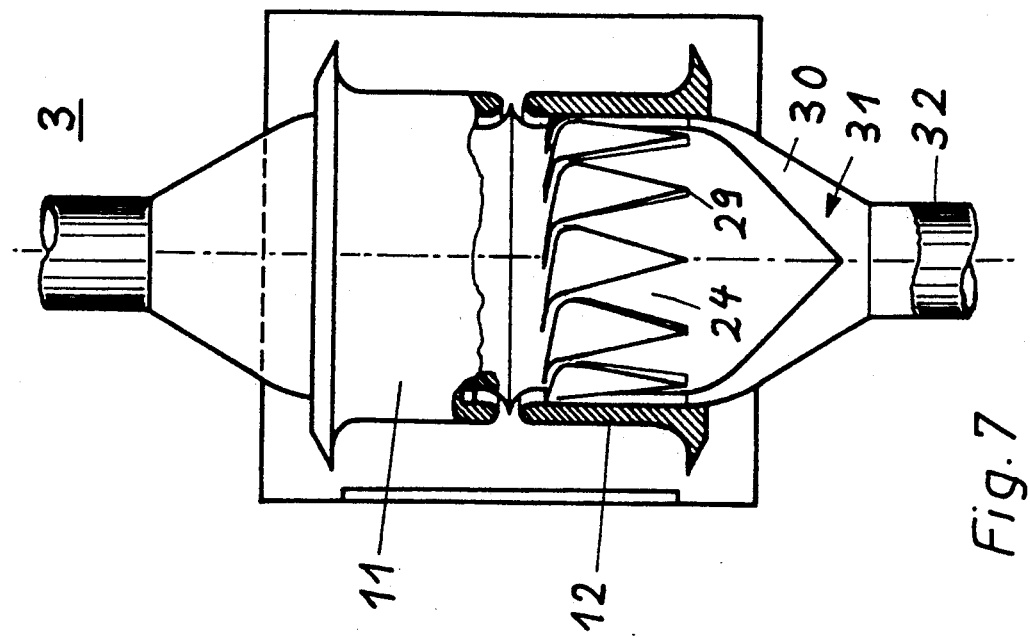
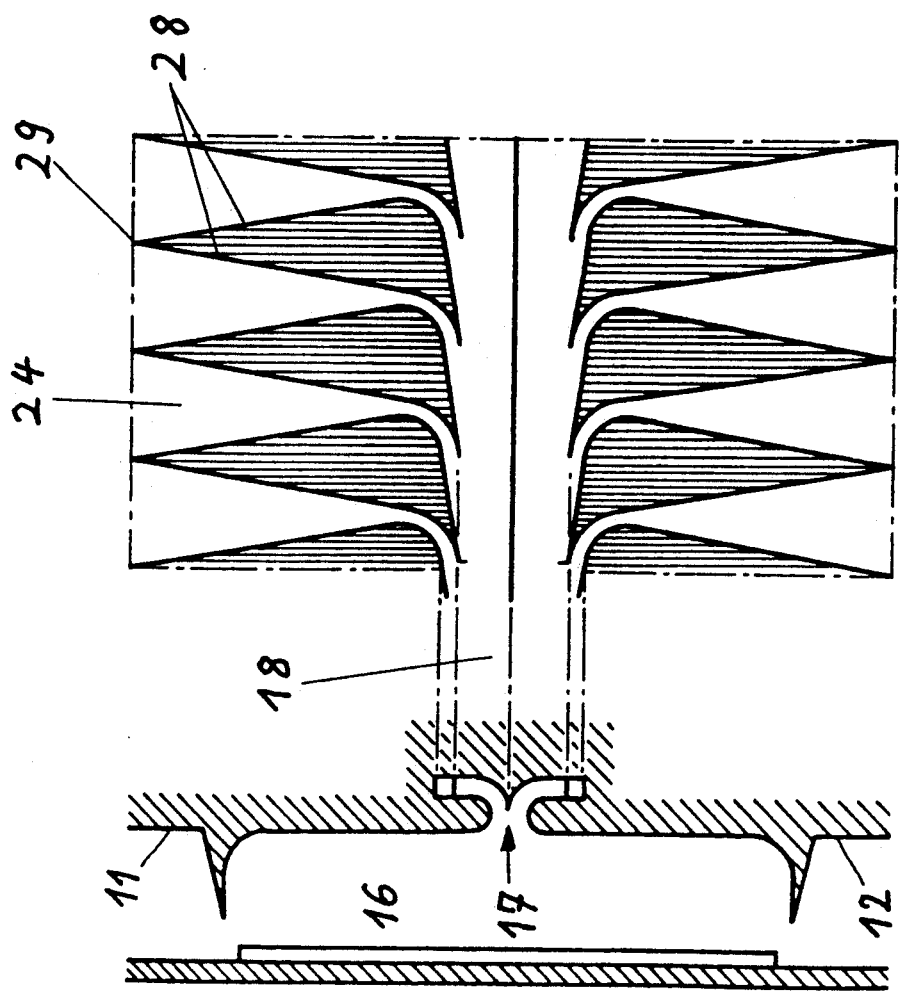
Fig. 7
Fig. 8

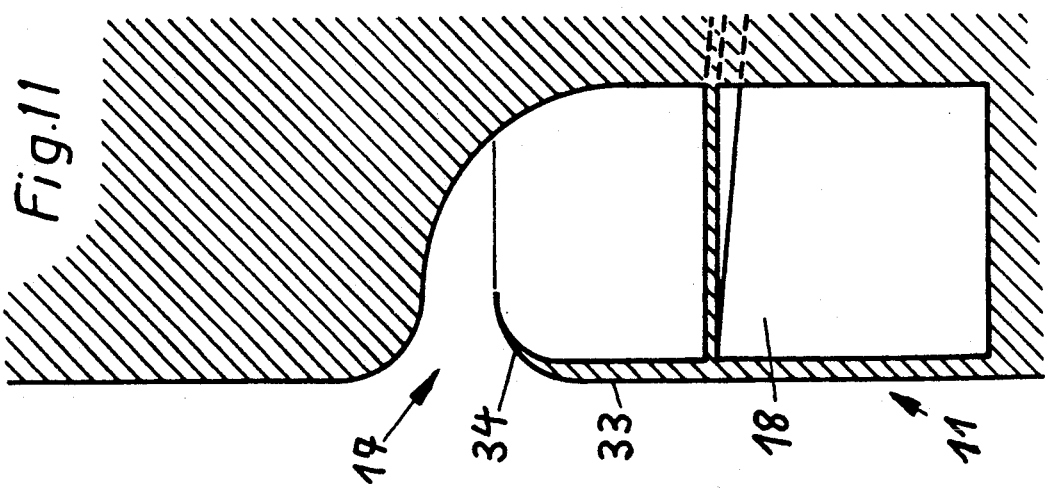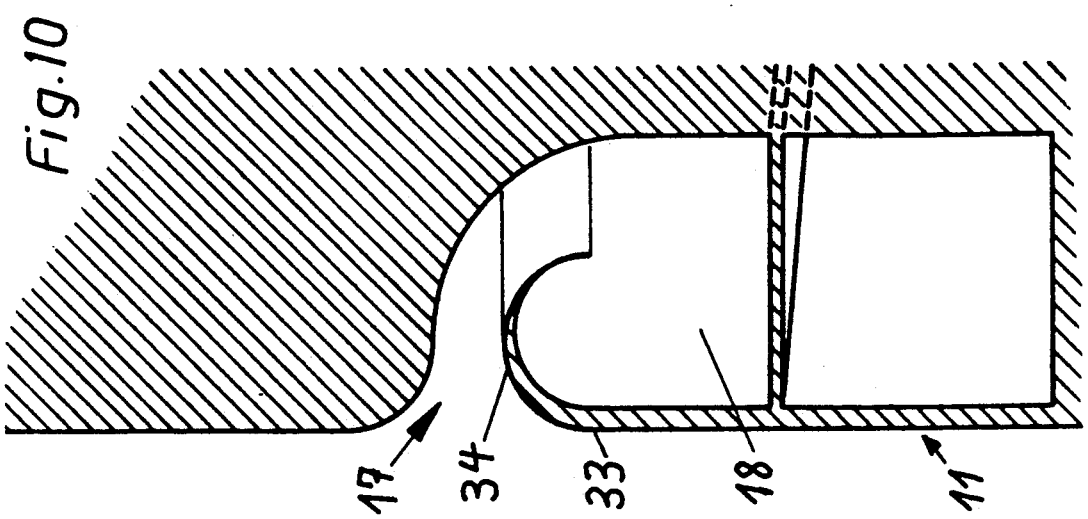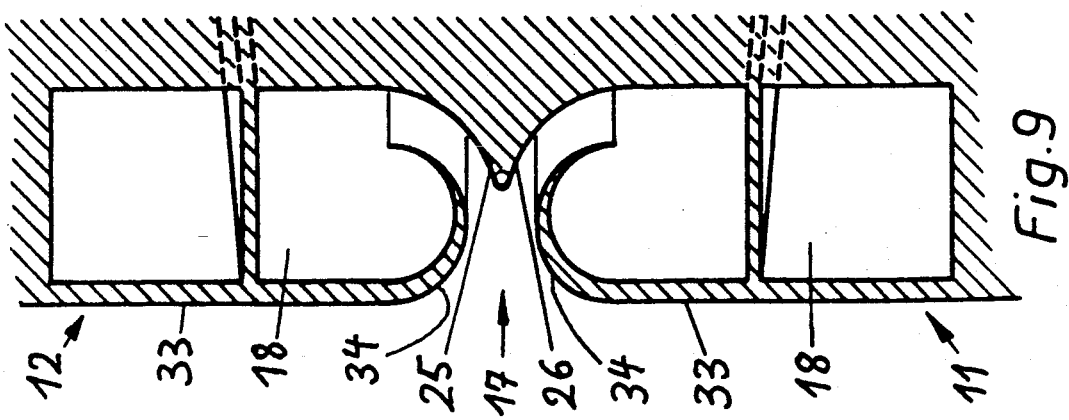

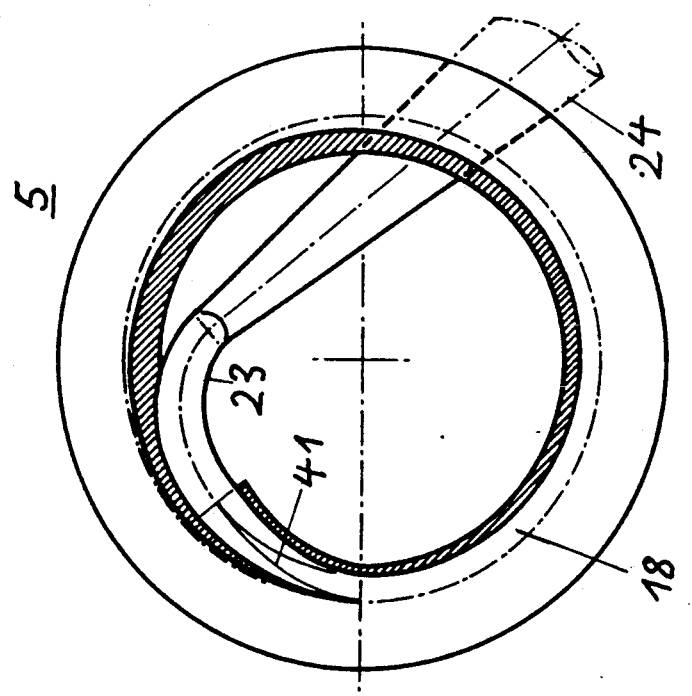
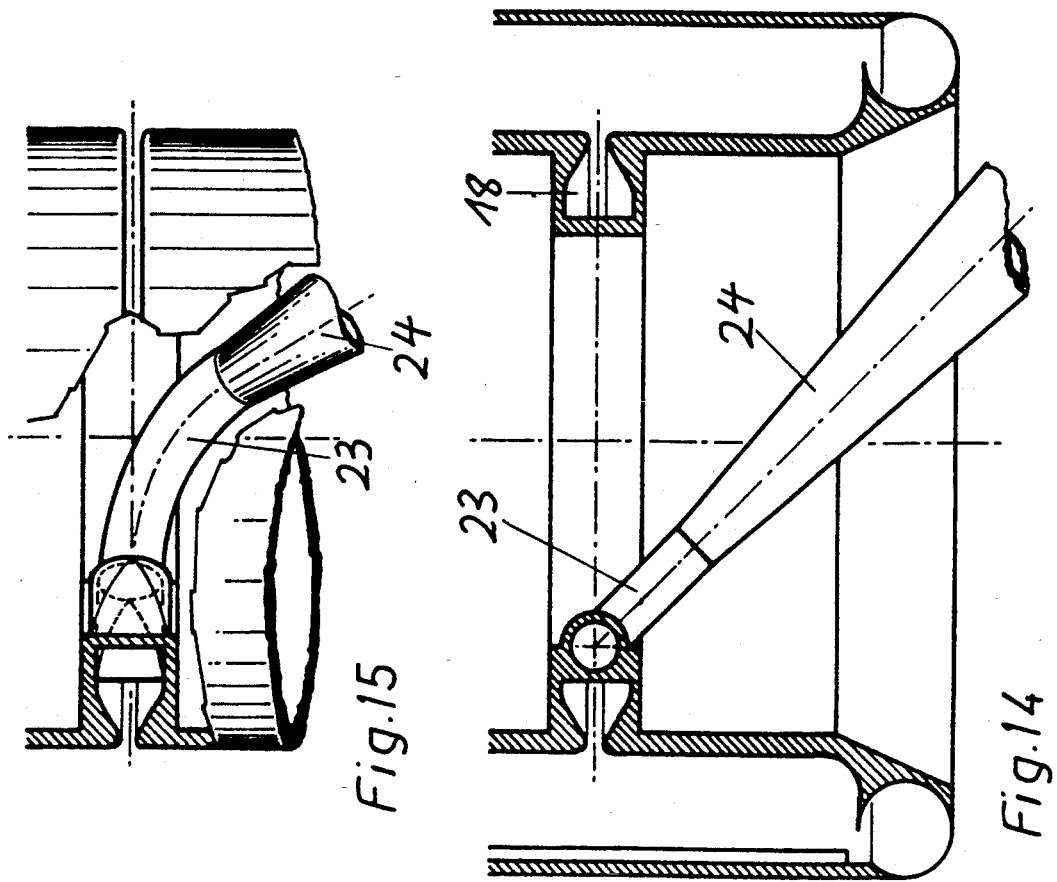
Fig. 16
Fig. 15
Fig. 14

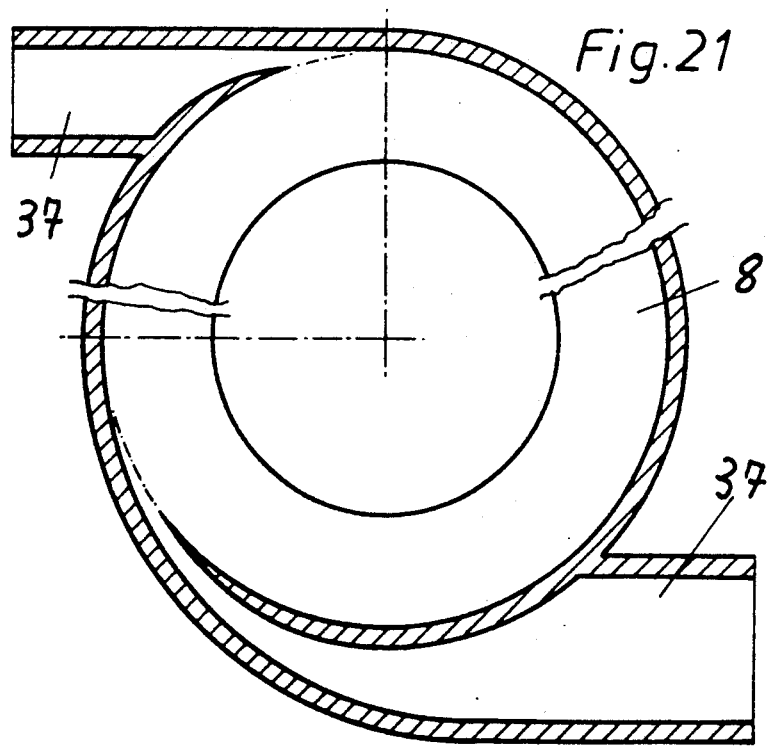
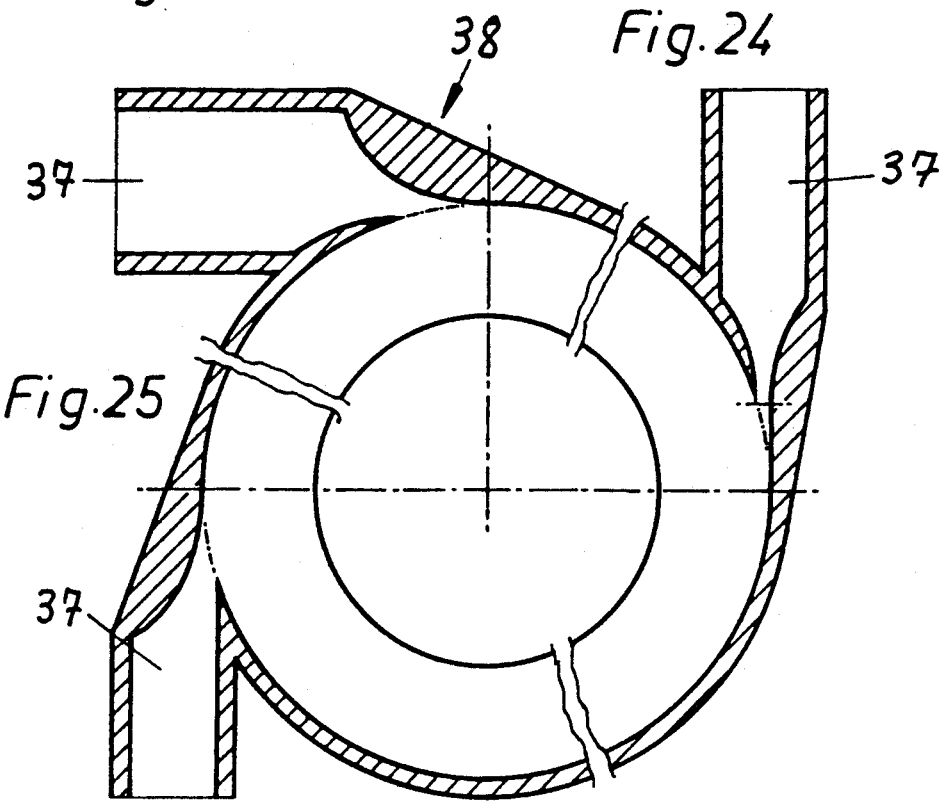

VORTEX CHAMBER SEPARATOR

The invention relates to a vortex chamber separator with at least one vortex chamber and in each case two immersion pipes, which are placed coaxially in the vortex chamber, and in each case extend toward one another from their end walls and are connected to a clean gas outlet.

A vortex chamber separator of this type is described, e.g., in DE-A1 32 03 498. It, like other known vortex chamber separators, has the drawback that because of the flow losses in the vortex chamber separator its separation efficiency relative to the energy use is relatively small and the multichamber arrangements often necessary to increase the separation efficiency have a relatively large construction volume. As a result, the range of use of these known vortex chamber separators is limited.

The object of the invention is to improve the vortex chamber separator of the initially mentioned type so that with a reduction of the flow losses the separation efficiency of the vortex chamber is improved and with single chamber and multichamber arrangements with increased separation efficiency a reduction of the construction volume is achieved.

According to the invention the object is achieved by the characterizing features of claim 1. Advantageous configurations of the invention are described in the dependent claims. These vortex chamber separators, equipped with an immersion pipe spiral housing, bends and diffusers for clean gas suction make possible small total pressure losses so that the vortex chambers comprise very small loss factors. According to the invention, certain ratios are observed with respect to the geometric dimensions. Vortex chamber diameter d, immersion pipe diameter dt and vortex chamber height h advantageously are linked to one another by an annular cross-sectional characteristic number K, which describes the heightwidth ratio of the cross section of the vortex annular space. The annular cross-sectional characteristic number $K_{opt}$ is defined by the relationship $(d-dt)/(2h)_{min}$. As small a value as possible is to be sought for the annular cross-sectional characteristic number $K_{opt}$. As a result, the advantage of the smallest vortex volume at constant vortex chamber diameter d and minimum vortex pressure losses connected with it in the vortex space of the vortex chamber is achieved. $K_{opt}$ is selected as small as possible so that the secondary flow is just still maintained to keep up the helical flow zone on the immersion pipes with its high separation capacity and thus separation efficiency. The helical flow zone is placed in a circular manner around the immersion pipes and forms the fine separation zone of the vortex chamber. The helical flow lines produce on the particles particle separation forces with two components perpendicular to one another. Radially the centrifugal force of the vortex flow in its full extent acts as a particle displacement force. Axially the flow sweeping force of the secondary flow acts on the particles. The aim is that the centrifugal forces on the particles become as great as possible and the flow sweeping forces become as small as possible. This results in small increases of the helical flow lines with high displacement forces (centrifugal forces) at great retention times of the particles in the fine separation zone. As a result great separation efficiencies are achieved. It is advantageous to design the vortex chamber so that the quotient of immersion pipe diameter dt and vortex chamber diameter d is close to 1. Basically it is true for $dt/d \leq 1$. At this selected ratio, the total pressure losses are reduced or at constant allowed pressure losses higher flow rates in the vortex chamber are possible. As a result, the separation efficiencies are increased and the gas throughput of the vortex chamber is increased. Further, the construction size and thus the construction volume of a vortex chamber at constant gas throughput is reduced. The quotient of vortex chamber diameter d and vortex chamber height h is to be considered as another magnitude. The quotient d/h as much as possible should be greater than 1 and can be 2 to 3. As a result, at constant gas throughput the radial density of the helical flow zone on the immersion pipes is reduced, which forms the fine separation zone. The minimum annular cross-sectional number K achieved, if a secondary flow just about still occurs. In an individual case minimum annular cross)sectional characteristic number K has to be determined experimentally, since it depends on different parameters, such as, e.g., geometric sizes of the vortex chamber, the wall roughness, the dust load of the crude gas, etc.

As a result, the particles are radially displaced in a shorter time from the fine separation zone, by which the separation efficiency of the vortex chamber is increased. On the other hand, at constant separation efficiency with radial density kept constant of the helical flow zone higher gas throughputs of a vortex chamber result with a thus possible reduction of the construction volume. But the increase of the ratio d/h has upper limits. At too great d/h values with vortex chamber height h kept constant, the rubbing wall surfaces of the vortex housing increase to such an extent that the angular momentum losses in the secondary flow zone increase too greatly and thus finally the separation efficiency is adversely affected. Moreover, the rotation symmetry of the flow can be unfavorably affected.

Figure 5:
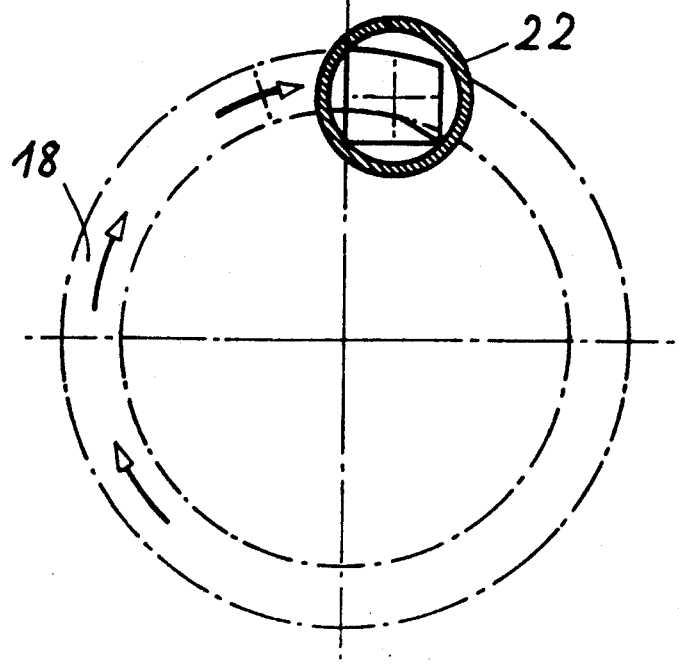
Figure 6:
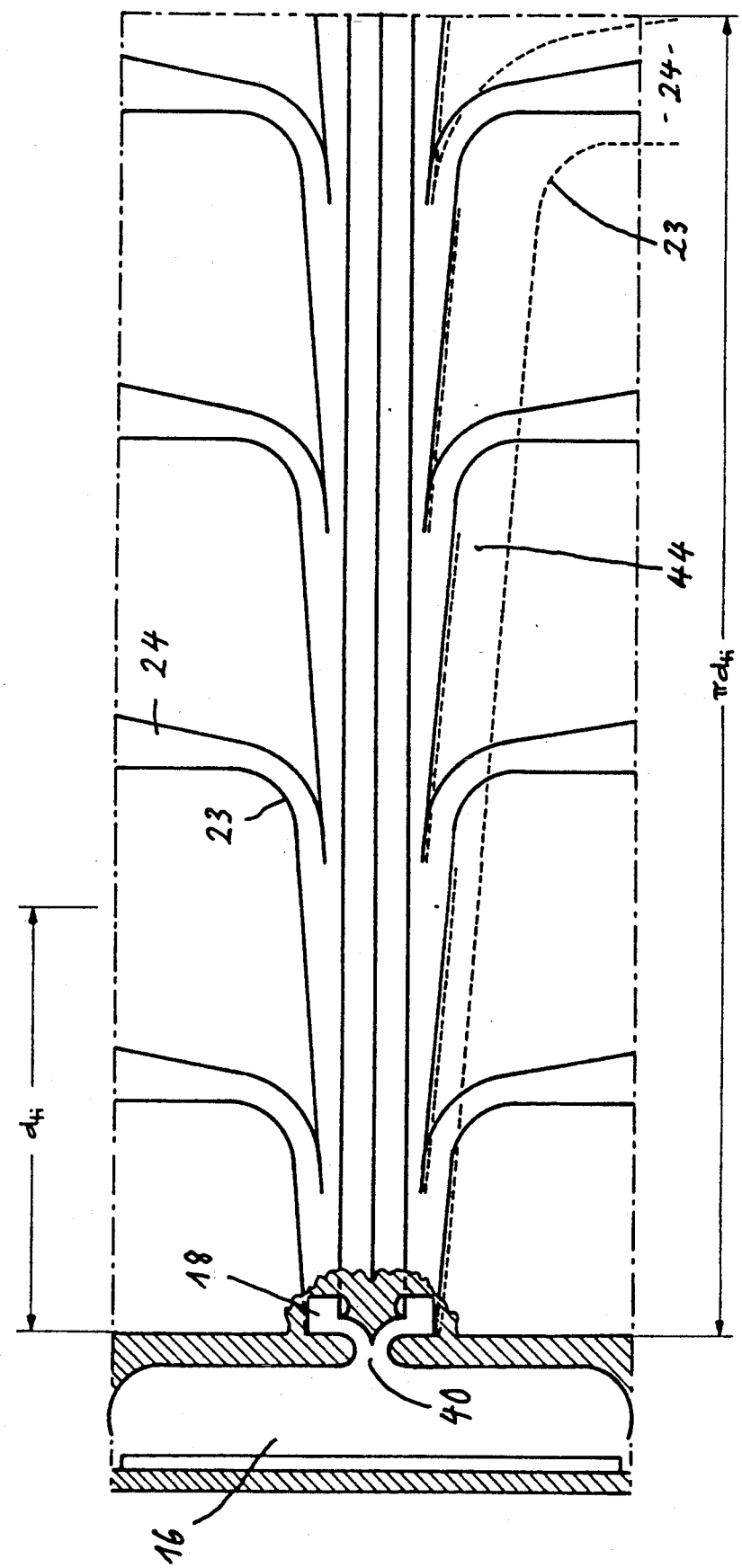
Figure 17:
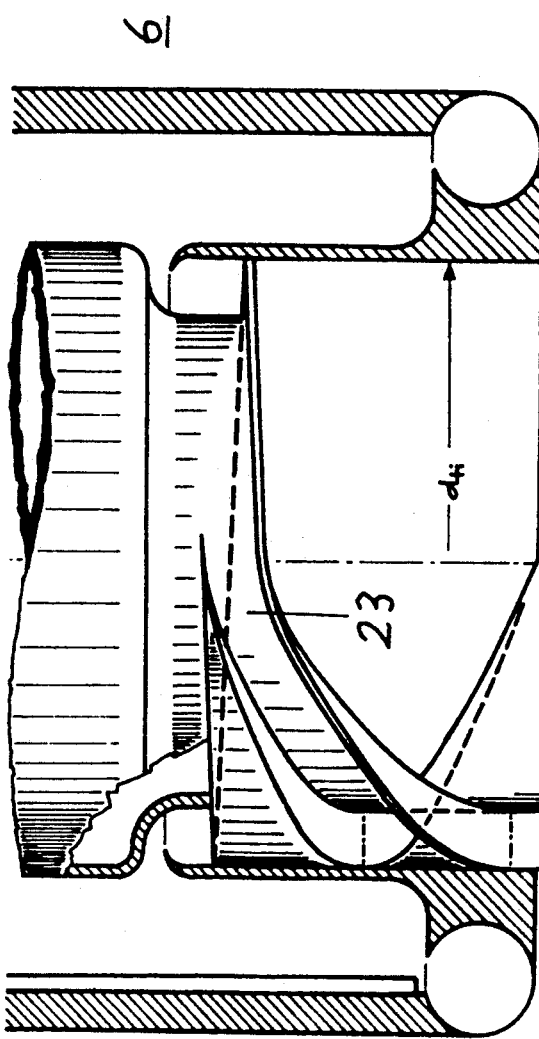
Figure 18:
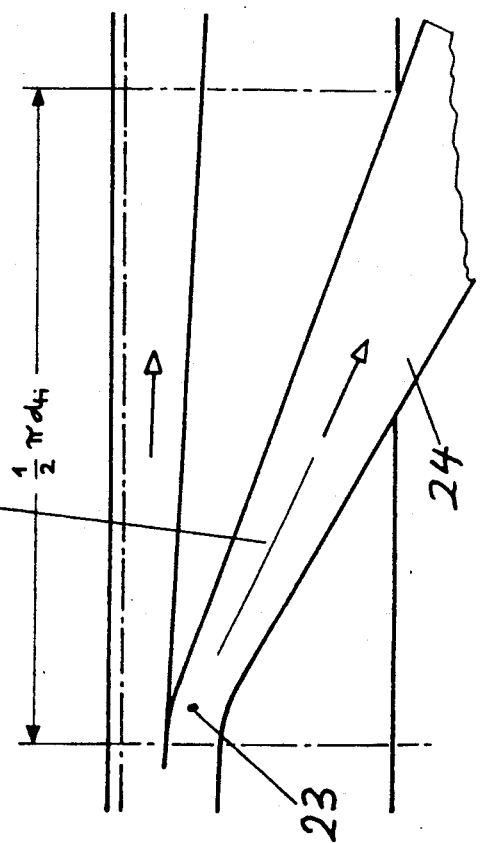
Figure 19:
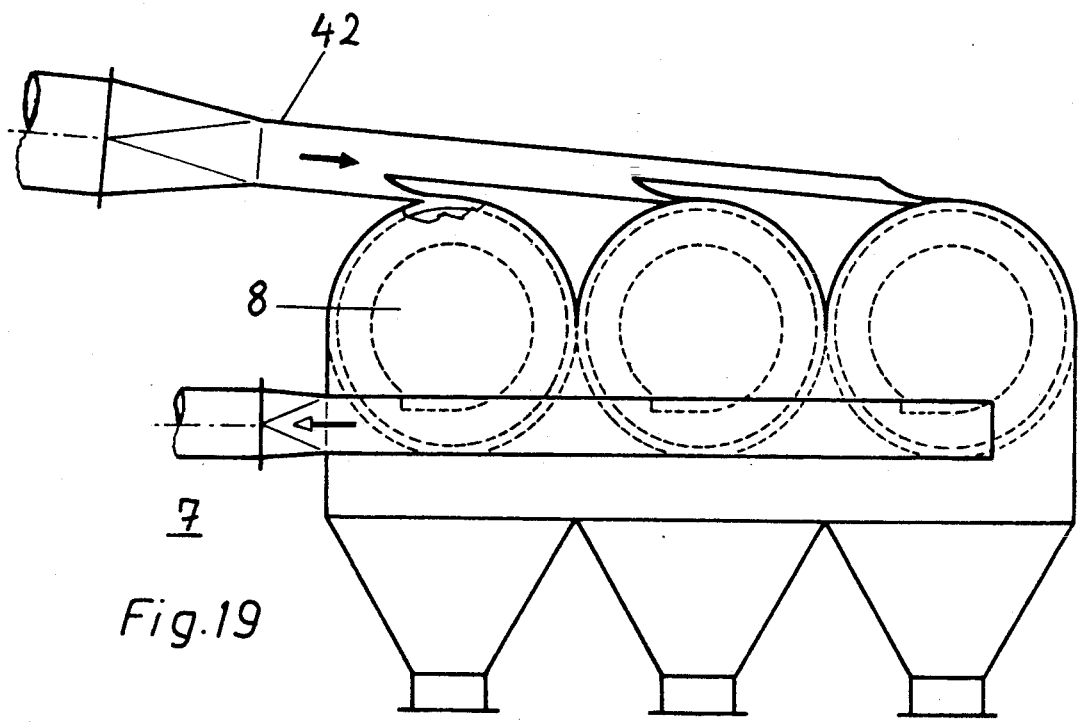
Figure 20:
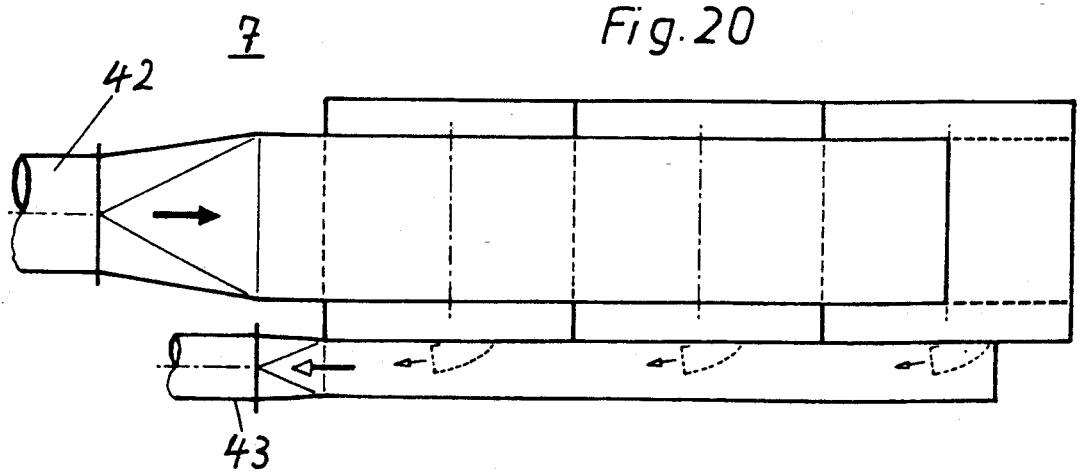

The invention is explained below in greater detail with the example of the embodiments represented in the drawings of vortex chamber separators. There are shown in:

FIG. 1 and 2, a vortex chamber separator with dust bunker in axial and radial section, FIG. 3, a vortex chamber separator with a tangential particle volume flow suction from the annular vortex housing in top view, FIG. 4 and 5, another design of a vortex chamber separator in side view in section and in radial section in cutout, FIG. 6 to 8, embodiments of immersion pipes in diagrammatic representations, FIGS. 9 to 18, embodiments of the immersion pipe spiral housing in diagrammatic representations, FIGS. 19 and 20, an arrangement of vortex chambers with one-sided clean gas continuation, FIGS. 21 to 25, various shapes of inlets for the vortex chambers.

A Vortex chamber separator 1, represented in FIG. 1 and 2, comprises in the area of end walls 9, 10 an annular duct 13 each surrounding related immersion pipe 11, 12. Each annular duct 13 is designed as annular vortex housing 14 which is connected by a lateral continuous and slot-shaped passage 15 to vortex annular space 16 surrounding immersion pipes 11, 12. In the lower area of annular vortex housing 14 a passage 20 each is provided, by which annular vortex housings 14 are opened to a dust bunker 19. An annular vortex, which supports the throughput of the particles, is produced in annular vortex housing 14 by the gas flow in vortex annular space 16. It is also possible to suction out a particle volume flow directly from annular vortex housing 14. For this purpose, a suction pipe 21, which is aligned tangentially to annular duct 13, is placed at passage 20 (FIG. 3). Dust, separated in the vortex chamber, can be carried off by suction pipe 21 and, e.g., be transported pneumatically to a site for storage or further processing. Annular vortex housing 14 with tangential particle volume flow suction can also be designed as axial or radial spiral housing. As a result, the rotation of the particle suction from vortex annular space 16 is improved.

In vortex chamber separator 2 according to FIG. 4 an axial immersion pipe spiral housing 18 is designed in the area of immersion pipe mouth 17. It is connected to vortex annular space 16 by a slot 40 formed in the area of immersion pipe mouth 17. Two bends 23, which are connected by a diffuser 24 each to a clean gas outlet connecting piece 22, are connected to immersion pipe spiral housing 18 on the flow suction side. In each case, bend 23 and diffuser 24 have a rectangular cross section. A small pressure loss can be accepted in the transition to the circular clean gas outlet connecting piece because of construction simplification. In this embodiment, it is possible to achieve pressure loss coefficients less than 0.5 (FIGS. 4 and 5). FIG. 6 diagrammatically shows the development of an immersion pipe area, in which several flow outlets with a bend 23 and a diffuser 24 each are designed on immersion pipe spiral housing 18. The rotation symmetry of the clean gas suction at immersion pipe mouth 17 is increased with this design of several spiral housing outlets and pressure losses are reduced. The increase of the rotation symmetry of clean gas suction in vortex annular space 16 has an effect upstream and improves the separation action in the fine separation zone around immersion pipes 11, 12. To configure the inlet flow through slot 40 as low in loss as possible, a flow guide piece 25 is provided at the flow inlet of immersion pipe spiral housing 18 (FIG. 4). It comprises two flow guide surfaces 26, behind which a groove-shaped recess 27 each is designed. Favorable secondary flow effects are achieved by these. It is also possible to have the several flow outlets on the periphery of an axial immersion pipe spiral housing 18 empty into a collection duct 44, which on the output side changes into a bend 23 and a diffuser 24. Such an embodiment is represented in FIG. 6 in dotted lines.

In vortex chamber separator 3, represented in FIGS. 7 and 8, several diffusers 24 are also distributed over the immersion pipe periphery. Respective adjacent diffuser side walls 28 are brought together in a point 29. This has the advantage that the flow, after flowing by points 29, can be further guided into an annular space 30. In vortex chamber separator 3 annular space 30 is designed as an annular diffuser 31, to whose point a pipe 32 is connected. In this embodiment, the speed of rotation on the immersion pipe, which was increased in the fine separation zone, can again be converted into pressure from the immersion pipe mouth 17 in a low pressure loss manner over a short distance so that the outlet losses by lost kinetic energy are kept small.

In the area of immersion pipe mouth 17 to reduce pressure losses for the gas flow at the inlet into immersion pipe spiral housing 18 it is advantageous to design immersion pipe end sections 33, forming immersion pipe mouth 17, rounded for favorable flow (FIGS. 9 to 11). If immersion pipe end sections 33 represent the inlets of an immersion pipe spiral housing 18, immersion pipe end sections 33 can be designed as concavely tongues 34 (FIG. 9 to 11). As represented in FIG. 9, concavely arched tongues 34 jut into the area of flow guide surfaces 26 of a flow guide piece 25. In this way, at the same time the area of immersion pipe mouth 17 is simplified in design. Immersion pipe mouth 17 can also be designed on a vortex chamber with a one-sided immersion pipe spiral housing 18 (FIG. 10). It is also possible to shorten concavely arched tongues 34 (FIG. 11). In this way further considerable design simplifications result.

Figure 13:
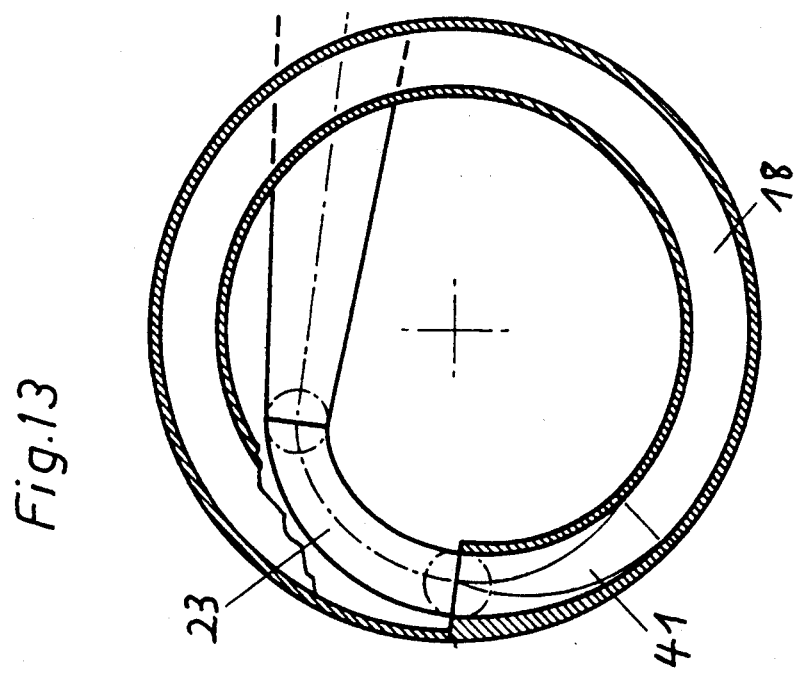
Figure 12:
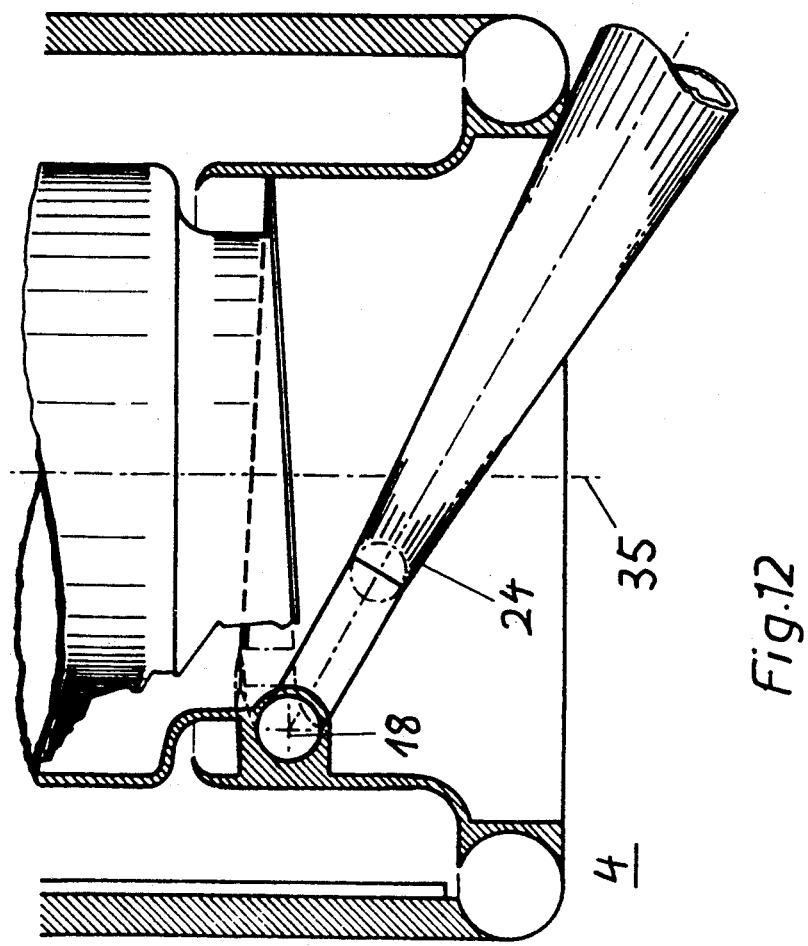

Diffusers 24 can have a rectangular, rectangle-like or circular cross section. A vortex chamber separator 4 is represented in FIGS. 12 and 13, in which a one-sided clean gas continuation is provided on axial immersion pipe spiral housing 18. At the outlet of immersion pipe spiral housing 18 a transition piece 41 is provided, with which the rectangular flow cross section of immersion pipe spiral housing 18 is converted into a circular flow cross section. A bend 23, which on the outlet side is connected to a diffuser 24, is connected to transition piece 41. Transition piece 41 can also be integrated into immersion pipe spiral housing 18. The flow cross-sectional conversion in the area of immersion pipe spiral housing 18 leads to a considerable construction simplification in the construction elements for the further guiding of the flow. Subsequent bends 23 can be made as a circular pipe and the following diffuser 24 can be designed as a circular diffuser. In an alignment of diffuser 24 at an acute angle to immersion pipe longitudinal axis 35 in the immersion pipe hollow space the construction volume of vortex chamber separator 4 is further reduced. It is also possible to design vortex chamber separator 4, represented in FIGS. 12 and 13, with a double or multiple clean gas outlet system.

Immersion pipe spiral housings 18 described so far comprise an axial spiral housing. But it is possible to design immersion pipe spiral housings 18 with radial spiral housings. An example of this is represented in FIGS. 14 to 16, which show a vortex chamber separator 5. The features of vortex chamber separator 5, going beyond the radial spiral housing of immersion pipe cross section 18, correspond to those of vortex chamber separator 4.

FIG. 17 shows a vortex chamber separator 6 with an immersion pipe spiral housing 18, which comprises an axial spiral housing. The clean gas continuation takes place on one side by a bent diffuser 24 with rectangular cross section, which is connected to a bend 23 also with a rectangular cross section. Bend 23 comprises only one small reverse angle to prevent pressure losses (FIG. 18). The bend of diffuser 24 with flat rectangular cross section induces in diffuser 24 itself a secondary flow, which improves the diffuser efficiency. This takes place because by the secondary flow, flow separations in separation-endangered cross-sectional areas of diffuser 24 are prevented. If a larger flow delay in diffuser 24 is desired, the diffuser opening angle has to be enlarged. In this case, it is advisable to place one or more baffles 36 in diffuser 24 (FIG. 18). As a result, diffuser 24 is divided for flow into several parallel diffusers. Baffles 36 can also be provided in diffuser 24 with only rectangular-like cross section or circular cross section. Especially in diffusers 24 with circular cross section both a baffle 36 and two baffles 35 to be placed in the form of a cross can be used. With oblique running of a diffuser 24 with rectangular cross section there is produced as a result an effect of a bend, which corresponds approximately to the immersion pipe radius.

If simple units are desired, it can be advantageous to connect several vortex chambers 8 to an arrangement 7, in which the clean gas continuation takes place on one side by a clean gas duct 43 (FIGS. 19 and 20). The crude gas is fed by a common crude gas duct 42 to vortex chambers 8.

FIG. 21 to 25 shows various inlet construction shapes in vortex chambers 8. In vortex chamber inlet area 38 each crude gas inlet connecting piece 37 is designed nozzle-shaped for this purpose. As a result, all flow inlets of vortex chambers 8 comprise greater contraction ratios of the inlet nozzles. This has the result that turbulence existing because of preceding flow processes is abated, by which the separation and precipitation efficiency of each vortex chamber 8 is increased. It is advantageous to impress a bend in vortex chamber inlet area 38 of the flow of the crude gas, which corresponds to the bend of the flow in vortex chamber 8. This can take place by embodiments such as represented in FIG. 21 and 22. But it is also possible to provide nozzle-like embodiments such as provided in FIGS. 23 to 25, but in which the crude gas entering vortex chamber 8 in the flow direction also is matched to the flow direction in vortex chamber 8.

Claims:

1. Vortex chamber separator with at least one vortex chamber and in each case two immersion pipes, which are placed coaxially in the vortex chamber, and in each case extend toward one another from their end walls and are connected to a clean gas outlet, characterized in that in the area of end walls (9, 10) an annular duct (13) each surrounding related immersion pipe (11, 12) is designed as an annular vortex housing (14), which is connected by a continuous slot-shaped passage (15) to vortex annular space (16) surrounding immersion pipes (11, 12), in that an immersion pipe spiral housing (18) is designed in the area of immersion pipe mouth (17), which is connected to vortex annular space (16) and at least one clean gas outlet, and in that the quotient d/h > than 1 and the annular cross-sectional characteristic number is $K_{opt}((d-dt/2h))_{min}$, and
dt = immersion pipe diameter,
d = vortex chamber diameter,
h = vortex chamber height.

2. Vortex chamber separator according to claim 1, wherein a passage (20) is designed in each annular vortex housing (14) for throughput of particles.

3. Vortex chamber separator according to claim 2, wherein a suction pipe (21), aligned tangentially to annular duct (13), surrounding passage (20), is placed at each annular vortex housing (14).

4. Vortex chamber separator according to claim 1, wherein annular vortex housing (14) with tangential particle volume flow suction is designed as axial or radial spiral housing.

5. Vortex chamber separator according to claim 1, wherein between immersion pipe spiral housing (18) and the at least one clean gas outlet connecting piece (22) a bend (23) is formed, which is connected to immersion pipe spiral housing (18).

6. Vortex chamber separator according to claim 5, wherein the duct section between bend (23) and clean gas outlet connecting piece (22) is designed as diffuser (24).

7. Vortex chamber separator according to claim 1, wherein on the flow inlet of immersion pipe spiral housing (18), facing immersion pipe mouth (17) a flow guide piece (25) is designed with a groove-shaped recess (27) placed behind each flow baffle (26).

8. Vortex chamber separator according to claim 6, wherein in the design of several diffusers (24) distributed over the immersion pipe periphery, in each case adjacent diffuser side walls (28) are brought together in a point (29) to which an annular space (30) is connected.

9. Vortex chamber separator according to claim 8, wherein annular space (30) is designed as an annular diffuser (31), to which a pipe (32) is connected.

10. Vortex chamber separator according to claim 6, wherein bends (23) and diffusers (24) are designed on one side on immersion pipe spiral housing (18).

11. Vortex chamber separator according to claim 1, wherein immersion pipe end sections (33) forming immersion pipe mouth (17) are designed as concavely arched tongues (34).

12. Vortex chamber separator according to claim 6, wherein diffuser (24) has a rectangular, rectangle-like or circular cross section.

13. Vortex chamber separator according to claim 12, wherein diffuser (24) is aligned at an acute angle to immersion pipe longitudinal axis (35).

14. Vortex chamber separator according to claim 1, wherein immersion pipe spiral housing (18) is designed as an axial or radial spiral housing.

15. Vortex chamber separator according to claim 14, wherein immersion pipe spiral housing (18) designed as axial spiral housing on one side or both sides comprises an immersion pipe (11; 11, 12).

16. Vortex chamber separator according to claim 12, wherein at least one baffle (36) is placed in each diffuser (24) with rectangular, rectangle)like or circular cross section.

17. Vortex chamber separator according to claim 1, wherein crude gas inlet connection (37) in vortex chamber inlet area (38) is designed nozzle-shaped.

* * * * *